350-96.1 SR

XR 3,549,867

SEARCH ROOM 2

United States Patent [11] 3,549,867

SUBSTITUTE FOR MISSING XR

[72] Inventor Robert Lee Malone
Palos Verdes Peninsula, Calif.

[21] Appl. No. 687,522
[22] Filed Dec. 4, 1967
[45] Patented Dec. 22, 1970
[73] Assignee Ex-Cello-O Corporation
Detroit, Mich.
a corporation of Michigan

[54] RECORD READER HAVING TRANSPARENCY THRESHOLD MEANS

6 Claims, 9 Drawing Figs.

[52] U.S. Cl. 235/61.11
[51] Int. Cl. G06k 7/10
[50] Field of Search 350/96; 250/227, 219; 235/61.115; 340/146.3

[56] References Cited

UNITED STATES PATENTS

| | | | |
|---|---|---|---|
| 1,751,584 | 3/1930 | Hansell | (235/61.115UX) |
| 2,988,271 | 6/1961 | John, Jr. et al. | 235/61.11 |
| 3,044,695 | 7/1962 | Burr et al. | 235/61.11 |
| 3,167,612 | 1/1965 | Strickholm | 178/7.1 |
| 3,226,690 | 12/1965 | Sharp | 340/172.5 |
| 3,238,357 | 3/1966 | Minka | 235/61.11 |
| 3,253,128 | 5/1966 | Wu Chen et al. | 235/61.11 |
| 3,365,699 | 1/1968 | Foster | 340/146.3 |
| 3,375,348 | 3/1968 | Goldstern | 235/61.11 |

*Primary Examiner*—Maynard R. Wilbur
*Assistant Examiner*—William W. Cochran
*Attorney*—Christie, Parker & Hale

ABSTRACT: An optical record reader using optic fibers for forming and distributing the light rays and a self-cleaning quartz lamp to produce a high intensity beam. The system is adapted to employ micrologic components with provision for automatic compensation in real time for the light transmission of a record member up to 60 percent transparency without adjustment.

INVENTOR.
ROBERT LEE MALONE
BY
Christie, Parker & Hale
ATTORNEYS

INVENTOR.
ROBERT LEE MALONE
BY
Christie, Parker & Hale
ATTORNEYS

INVENTOR.
ROBERT LEE MALONE
BY
Christie, Parker & Hale
ATTORNEYS

BY

RECORD READER HAVING TRANSPARENCY THRESHOLD MEANS

This invention relates to a record reader and more particularly to improvements in the construction of an optical read-out device for use with record members having light transmitting marks thereon.

This invention is an improvement over the earlier filed application bearing Ser. No. 455,798; now U.S. Pat. No. 3,444,358 granted May 13, 1969 filed on May 14, 1965 and entitled RECORD READER and assigned to the same assignee as the present application.

The construction of the reading system of the present invention is of the general type disclosed in the aforementioned copending patent application. The reading system comprises improvements in the means for forming and distributing the light rays from a light source onto a record sensing element along with improvements in the light source and the means for sensing the marks recorded on the record member.

The present invention provides an improved and more reliable record reading system through the use of fiber optics for forming and distributing the light rays from a long-life light source comprising a self-cleaning quartz lamp which is virtually vibration proof. The light source when employed with the light fiber system of the present invention, does not require any focusing and coacts with the fiber system to distribute the light from the essentially round light pattern into a rectangular pattern for sensing the record members. The record reading system of the present invention is advantageously adapted to employ micrologic components with provision for automatic compensation, in real time, for the light transmission of the record member up to 60 percent transparency without operator adjustment.

Specifically, the present invention provides a read-out device for reading paper record members of variable light transmitting properties comprising a photocell having a plurality of individual elements individually producing electrical output indications in accordance with the light signals transmitted by means of the recorded marks on the record member impinging on an element of said cell. The cell is mounted in a spaced relationship with a light source to allow the record member to be positioned therebetween. The light source is adapted for defining a high intensity pencil-thin light beam such as is provided by the commercially available incandescent lamp identified as the General Electric 1974 quartz iodine cycle lamp, or its equivalent. A light fiber system is arranged with the light source to accept an essentially circular light pattern and convert it to a rectangular light pattern for impingement onto a record sensing element or photocell. The photocell is further assembled in a preselected fashion for defining discrete sensing areas in accordance with the configuration of the record member including means for sensing preselected areas of the record member for the purposes of determining the light transparency thereof and correcting the reading circuitry in accordance with the sensed transparency in the area of the record marks being sensed. The information signals provided by the photocell are each employed with an individual differential input comparator coupled to be responsive to the information output indications from a single cell in combination with the transparency indications and a timing signal. The timing signal is developed from marks on the record member associated with each group of information on the record member to provide the desired information output indications electrically representing the recorded group of marks on the record member.

These and other features of the present invention may be more fully appreciated when considered in the light of the following specification and drawings, in which:

FIG. 7 is a sectional view taken along the line 7–7 of FIG. 5;

Figure 2:
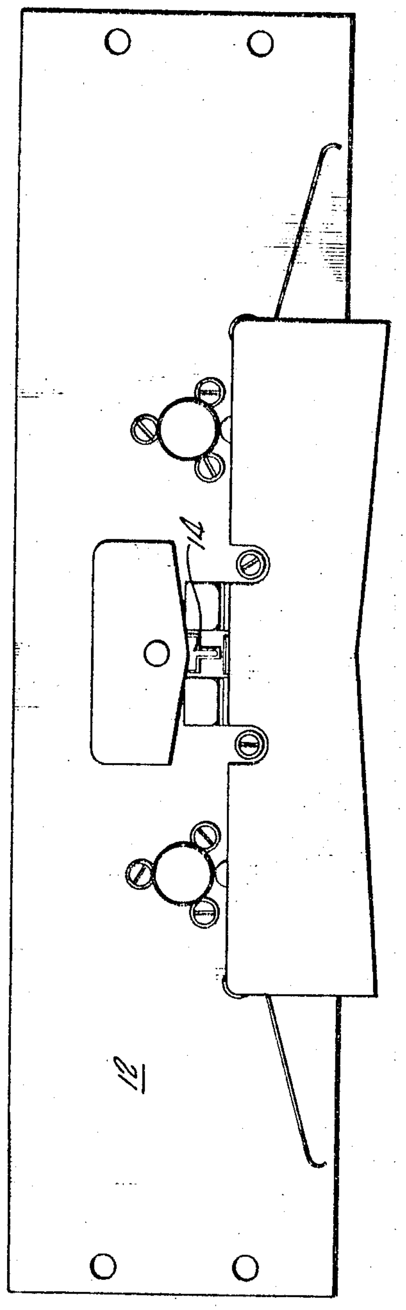
FIG. 2 is a front elevational view of a record reading system embodying the present invention.
Figure 1:
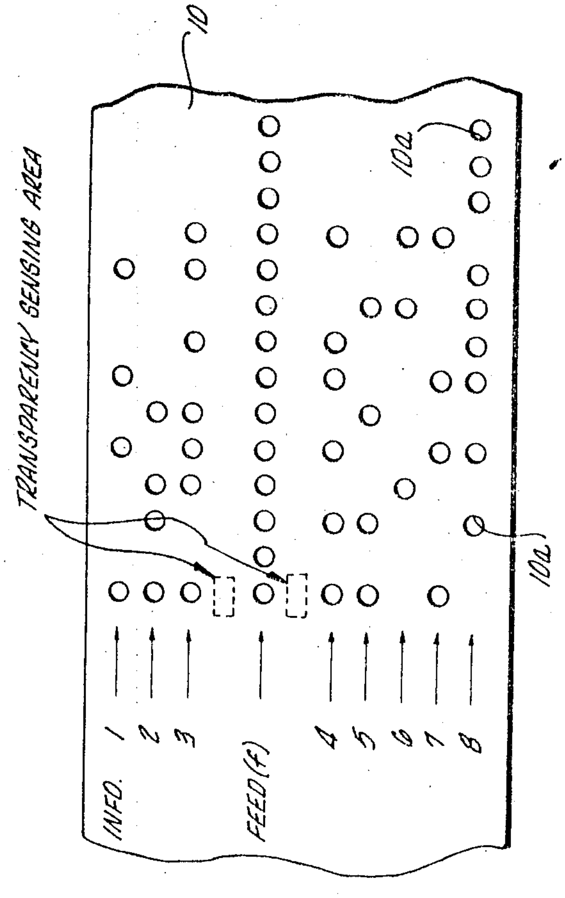
FIG. 1 is a diagrammatical illustration of a record member, in the form of a paper tape, illustrating the format for recording of the information marks including the relative location of the record transparency sensing areas.
Figure 3:
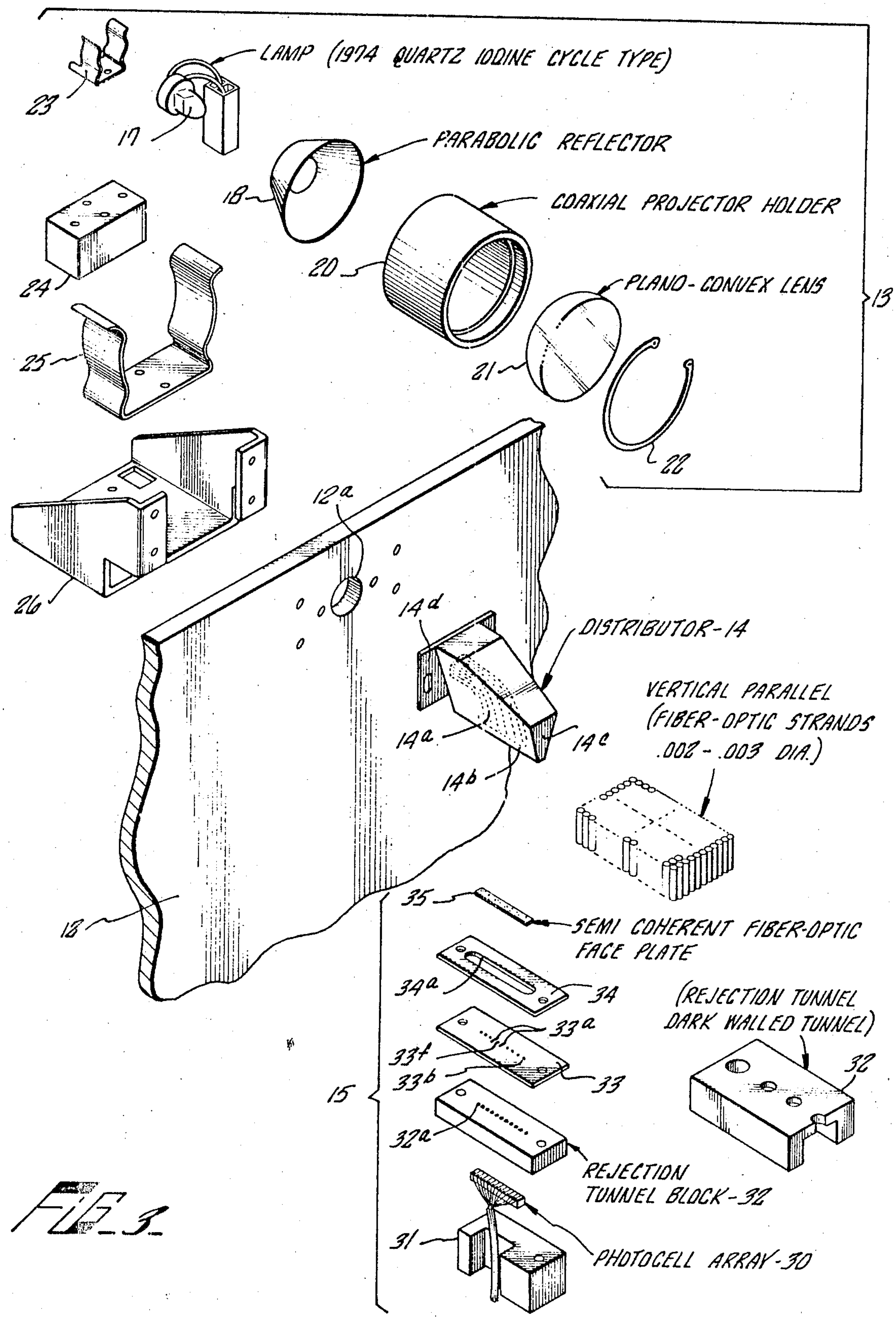
FIG. 3 is an exploded view of the record reading system illustrated in FIG. 2.

Now referring to the drawings, the general organization of the improved record reader will be described. A record member for which the record reader of the present invention is particularly adapted to be used is shown in FIG. 1 as a conventional paper tape 10 having information bearing marks recorded thereon in terms of binary coded perforations, such as the perforations 10*a* illustrated on the tape 10. These perforations 10*a*, of course, are to be sensed to provide corresponding electrical information signals along with the optical properties of the record member. As is conventional, intermediate the longitudinal edges of the tape 10 there is provided a series of feed holes, *f*, which in this instance are arranged intermediate the third and fourth information rows on the tape 10. This feed perforation, *f*, is arranged with each column of information in the information rows 1—8 and, accordingly, is considered as a timing mark for a group or column of information. To sense the transparency of the record member 10, in real time, the invention is defined so that the transparency of the record member is sensed on the opposite sides of the feed track, *f*, by the provision of individual sensing elements which will be explained more fully hereinafter.

The record reading system of the present invention is mounted on a panel 12 with the light source 13 mounted on one side of the panel 12 and with the normally exposed side of the panel 12 mounting the fiber optical distributor 14. The distributor 14 is spaced adjacent the record sensing element or read-out assembly 15. The electrical signals derived from the read-out assembly 15 are processed by means of the read-out circuitry 16 to provide the electrical output representations of the marks recorded on the record member 10.

Figure 4:
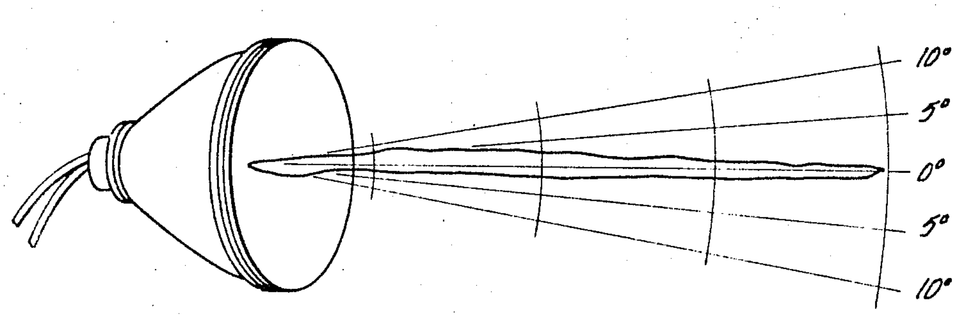
FIG. 4 is a diagrammatical representation of the light source and the accompanying distribution pattern of the source as employed in the present invention.
Figure 5:
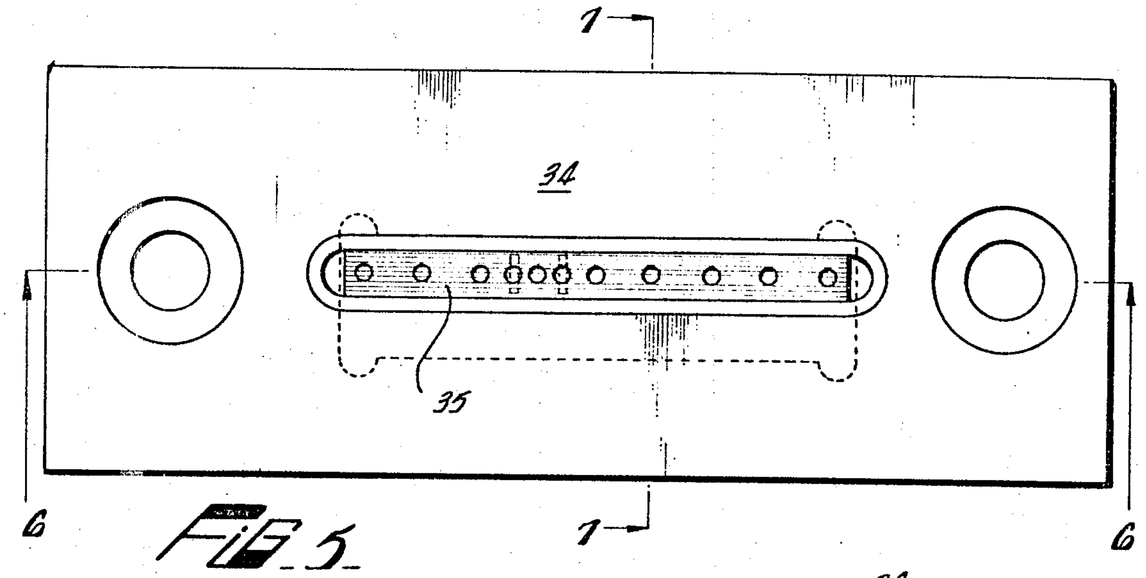
FIG. 5 is a top plan view of the sensing element.
Figure 6:
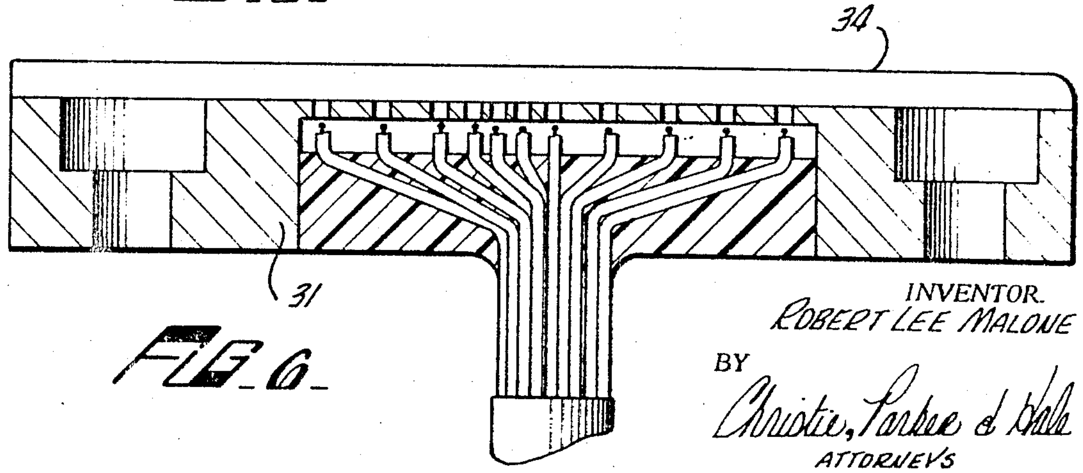
FIG. 6 is a cross-sectional view of the sensing element of FIG. 5 taken along the line 6–6 of FIG. 5.

The light source of the present invention is constructed for providing a high intensity pencil-thin light beam. The light source 13 is conveniently defined to provide such a pencil-thin light beam through the employment of the commercially available General Electric 1974 quartz iodine cycle lamp 17, or its equivalent. The General Electric lamp 17 is preferably employed with a parabolic reflector 18 mounted therewith to provide the pencil-thin light pattern. Reference to FIG. 4 will show the desired light distribution pattern to be on the order of 10 °. The 1974 quartz iodine cycle lamp manufactured by the General Electric Company is a self-cleaning quartz lamp which is particularly advantageous for photoelectrically reading record members of the type under consideration since it is derated to a life expectancy of 15,000 hours and is virtually vibration proof. The iodine cycle process employed in the G. E. lamp consists of a regenerative cycle which minimizes lamp blackening by causing most of the evaporated tungsten not to settle out on the bulb wall. This self-cleaning action causes the lamp to give almost full light throughout the life of the lamp and therefore more reliable record reading results than heretofore thought possible.

In the particular embodiment of the light source 13 employed in this invention, the lamp 17 and the parabolic reflector 18 are mounted at one end to a coaxial projector holder 20 with the opposite end of the holder 20 mounting a planoconvex lens secured thereto by means of the retaining ring 22. This arrangement causes a circular light pattern to be projected from the lens 21. The lamp assembled in this fashion is secured to a lamp bracket 23 mounted to a mounting block 24. The coaxial projector holder 20 thought similarly mounted by means of a projector clip 25 secured to a mounting bracket 26. The lamp mounting block 24 and the mounting bracket 26 further function as a heat sink for the light source 13. The mounting bracket 26 is mounted to the back face of the record reader panel 12 adjacent a light projecting aperture 12*a* provided therefor. The aperture 12*a* is defined to be of essentially the same configuration as the light pattern from the source 13 or the planoconvex lens 21.

The distributor means 14 is shown in the form of a fiber optical system mounted on the outside face of the panel 12 at the aperture 12*a* to accept, form and distribute the light bundle to the sensing assembly 15. In this particular instance, the distributor 14 functions as a round-to-rectangular conversion element and is formed with fiber optic strands of 0.002—0.003 inch in diameter. The fiber optical elements 14*a* are formed at one end in a circular configuration to accept the pencil-thin light beam through the apertures 12*a* and to convert it into the rectangular pattern corresponding to the rectangular pattern for the light exposed end of the read-out element 15. The rectangular pattern is provided by the end 14*b* of the distributor 14. The light fiber system 14*a* is encapsulated in a plastic material 14*c* fixed to a mounting bracket 14*d* which, in turn, is secured to the reader panel 12 about the aperture 12*a*.

The read-out assembly 15 comprises a photocell array 30 shown as a photovoltaic array consisting of 11 individual elements for sensing the eight information tracks, the timing or feed track, *f*, and the transparency areas on the opposite sides of the feed track. The photocell array 30 is mounted in a block 31 with its light exposed surface mounted with a rejection tunnel block 32 having dark walled tunnels or light transmitting apertures defined thereon for transmitting the light rays onto the light sensing element 30 in accordance with the recorded marks or perforations on the record member 10. The rejection tunnels 32*a* are illustrated in a circular configuration mounted in close relationship with an aperture mask 33 constructed of a relatively thin material and also provided with a series of 11 light transmitting apertures. In this instance, the light transmitting apertures for sensing the transparency of the record member 10 are defined as the rectangular apertures 33*a* on opposite sides of the feed hole or timing aperture 33*f*. The light transparency slots 33*a* are of a longitudinal dimension to cover essentially the entire area of the record member on tape 10 devoted to recording a particular column of information and thereby giving a true indication of transparency of the record member in the immediate area of the portion of the record member undergoing reading. The remaining apertures for the mask 33 are of a circular construction as exemplified by the apertures 33*b*.

A cover member or tape glide 34 is mounted over the aperture mask 33 and has a longitudinally extending slot 34*a* defined to accept a fiber optical array 35 thereon arranged in a rectangular configuration conforming to the rectangular configuration of the end 14*b* of the light distributor 14. The fiber optical array 35 comprises semi-coherent fiber optical strands of the same diameter as that employed in the distributor 14. The fiber optical strands for the member 35 are arranged in a vertical parallel relationship for transmitting the light thereto onto the aperture mask 33 and thereby into the dark walled tunnel 32*a* for impinging onto the photocell array 30. The read-out assembly 15 then is seen to be a compact element over which the record member or tape may glide to allow the desired reading action.

Figure 9:
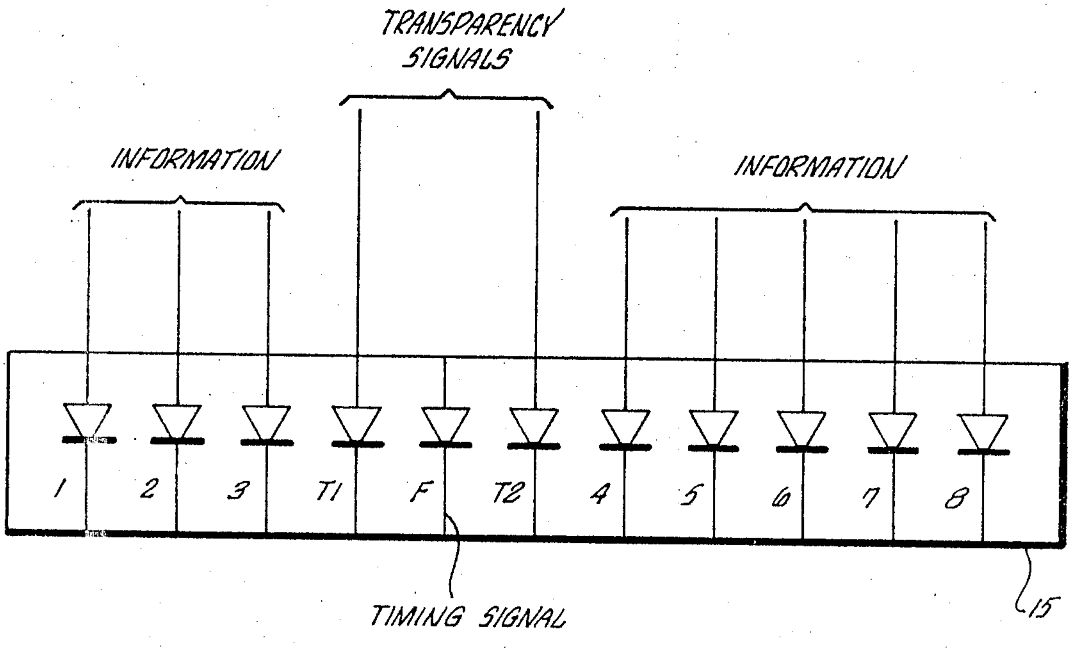
FIG. 9 is a schematic illustration of the relationship of the individual sensing elements for the record sensing element for reading a paper tape of the type illustrated in FIG. 1.
Figure 1:
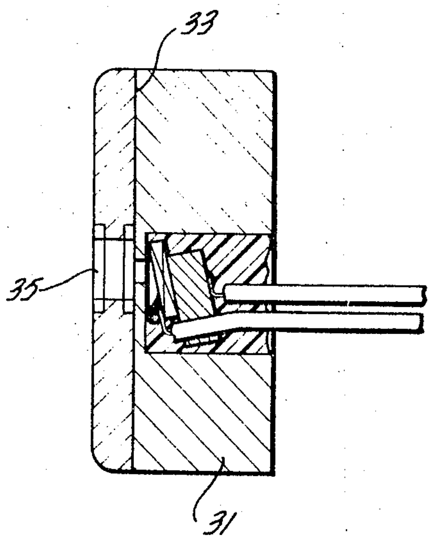

Now referring to FIG. 9, the relationship of the format of the record member 10 as illustrated in FIG. 1 and the photocell array 30 for the purposes of the present teachings can be readily appreciated. As illustrated in FIG. 1, the first three rows of the record member 10 are information rows and accordingly the first three sensing elements for the photocell 15, reading from left to right in FIG. 9, are provided to sense the light rays derived from these first three information rows. The fifth sensing element reading from left to right senses the feed track, *f*, on the record member 10 and which output signal is used as the timing signal for the reading circuitry. The transparency of the record member 10 is determined by sensing the areas on the opposite of the feed track, *f*, or the areas between the track 3 and track *f* and track 4 and track *f*, as outlined in FIG. 1. Accordingly, the sensing element T1 and T2 arranged on the opposite sides of the element *f* as illustrated in FIG. 9 provide the transparency signals for the reading circuit 15. The remaining elements to the right of the element T2 are defined for reading the information tracks 4 through 8.

Figure 8:
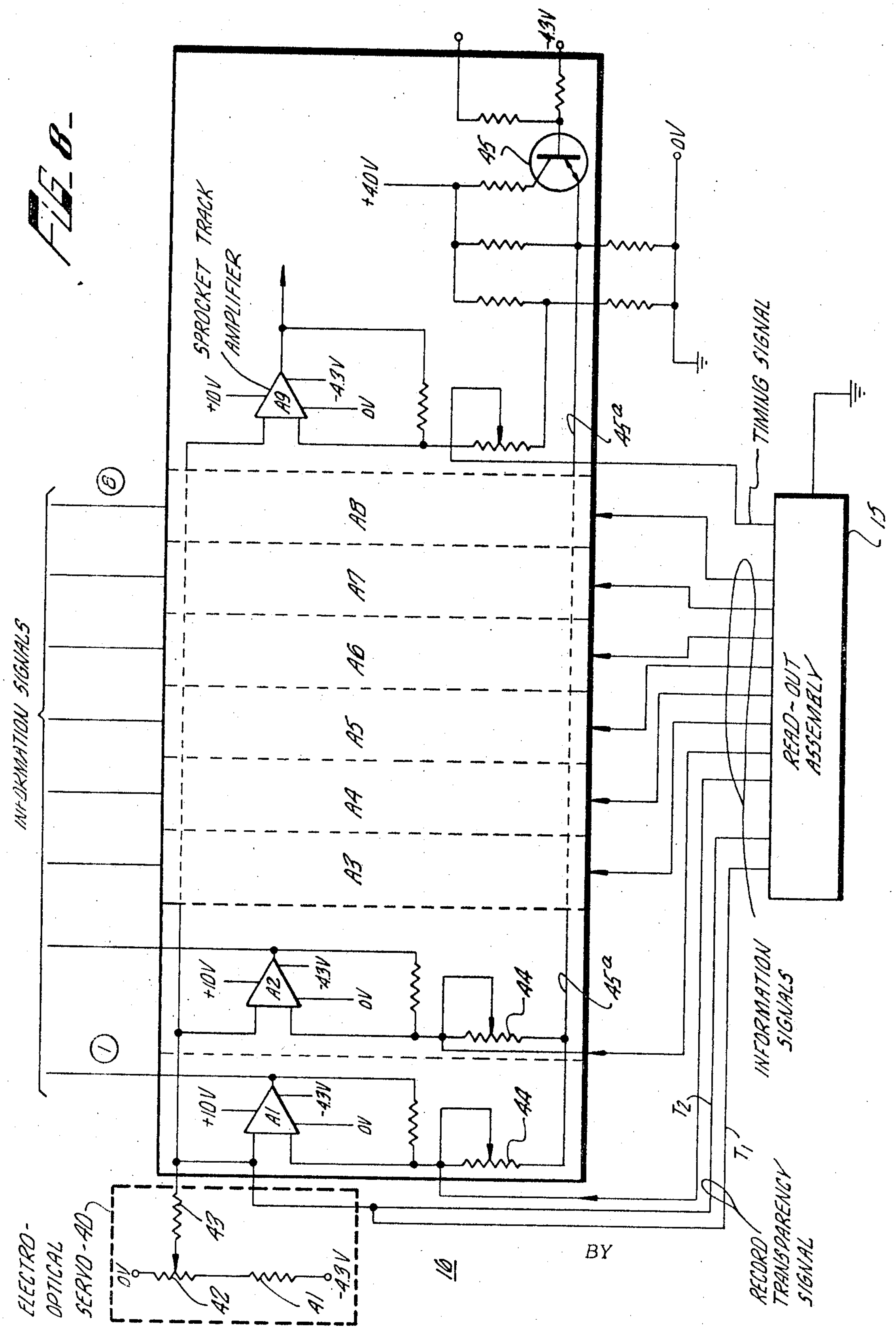
FIG. 8 is a schematic illustration of the reading circuit means for the record sensing element of the present invention.

Now referring to FIG. 8, the reading circuit 16 will be described. The reading circuit 16 is illustrated with the record sensing element 15 arranged in accordance with the format of FIG. 9 for the practical embodiment. The format shown in FIG. 8 is employed for simplifying the description of the circuit 16. The reading circuit 16 comprises a differential input comparator for each of the information tracks and the sprocket track. In this instance, nine such comparators or amplifiers are illustrated. The differential input comparators may be advantageously constructed of integrated or micrologic circuits such as the micrologic circuits 710-C commercially available from Fairchild Semiconductor, a division of Fairchild Camera and Instrument Corp. The comparators are further identified as the comparators A1 through A9 with the detailed circuits for only comparators A1, A2 and A9 being illustrated, it being understood that the remaining circuits are identical for the circuits for the comparators A3 through A8. The circuits for the comparators A3 through A8 are identical to that shown for the comparators A1 and A2.

The tape transparency signals are identified as the signals T1 and T2 and are connected together as a common input to each of the amplifiers A1 through A9 in combination with an electro-optical servo network 40. The electro-optical servo network 40 defines the amount of current that flows as a result of the sensed transparency of the record member 10 or sets a threshold level for transparency correction. This current defines the current signal for one of the inputs to each of the differential comparators A1 through A9. The network 40 comprises a resistor 41 arranged in series with the potentiometer 42 and with a voltage source on the order of −4.3 volts. The free end of the resistor 41 is connected to the negative terminal of the source while the remaining end of the potentiometer 42 is connected to ground. A resistor 43 is connected to the potentiometer 42 and to one input of each of the amplifiers A1—A9. The network 40 is proportioned so that when an opaque record member is used very little current, if any, is subtracted from that provided by the network 40 as a result of sensing the transparency of the record member. As the transparency of the tape increases the current provided by the tape transparency signal is subtracted from that normally provided for an opaque tape whereby the differential required for triggering the comparators A1—A9 will decrease with the increase of the tape transparency. This relationship remains true as the tape transparency approaches that of a perforation 10*a*. This transparency signal, then, is coupled in parallel circuit relationship to the same input of each of the remaining comparators A2—A9.

The second input to the comparators A1—A9 consists of the individual information signals derived from the record member 10 in combination with a light threshold bias provided by the potentiometer 44 arranged in the input circuits for each of these second input circuits for the amplifiers A1—A9. The information signal, then, provided from the record sensing element 15 must have a sufficient amplitude to overcome the threshold bias for triggering the individual amplifiers. In order to cause the individual amplifiers A1—A9 to conduct each must have its input conditions satisfied. These input conditions are that the corresponding information cell for the element 15 must be energized by a light signal and that the voltage level of the common bias line connected to the potentiometers 44 must be lowered. This lowering of the bias signal is accomplished by the signal developed from sensing the feed hole *f* and will be described hereinafter. The effect of the triggering or the conduction of the timing circuit A9 is to lower the common bias line so that the signals derived from the information tracks will allow the corresponding differential amplifier to produce an output that accurately represents the information recorded on a record member at its output.

The timing amplifier A9, in addition to having the circuitry for the remaining amplifiers A1—A8, includes a gating amplifier 45 which is triggered with the conduction of the amplifier A9. In its normal condition the circuit configuration for the gating amplifier 45 is arranged so that it is in a conductive condition and its emitter electrode is connected in a parallel circuit relationship with each of the potentiometers 44 for the amplifiers A1—A9. This, then, defines the threshold bias range for the amplifiers A1—A9. With the sensing of the feed hole, *f*, the amplifier A9 is rendered conductive and being rendered conductive switches the conductive condition of the gate amplifier 45 to render it nonconductive and therefore lower the common bias line **45*a*. This action removes the bias supplied to the potentiometer 44 and permits the output from the photocells 1—8** to change the output state of the respective amplifiers A1—A8. In this fashion, the electrical information signals derived from the amplifiers A1—A8 appear at approximately the same time as the timing signal or the signal corresponding the *f* track.

With the above structure in mind, the operation of the record reading system can be readily appreciated. The energization of the light source 13 and the presentation of the record member 10 between the distributor 14 and the readout assembly 15 allows the record member to be sensed as it is advanced over the assembly 15. With the presentation of the first column of recorded information of the record member to the assembly 15, it will now be appreciated that the rectangular configuration provided by the distributor 14 will illuminate this first column to allow the light to be transmitted therethrough. At the same time the light will be transmitted through the record member 10 at the transparency sensing areas in accordance with the transparency of the record member. These light signals, then, impinge upon the fiber optic face plate 35 for transmitting the eight columns of light defined by the light emerging from the bottom of the record member 10 and are transmitted through the aperture mask 33 and the rejection tunnel block 32 to the photovoltaic cell 30 for producing corresponding electrical output indications. Initially, the timing track amplifier A9 is rendered conductive and thereby renders the gating amplifier 45 nonconductive. With the switching of the conductive conditions of gating amplifier 45, the bias supply to the potentiometer 44 is removed and the amplifiers A1—A8 are in condition to conduct in accordance with the reception of a signal through the record member 10 to reproduce electrically the pattern of the information marks on the member 10.

I claim:

1. A read-out device for sensing light transmitting marks arranged in rows and columns on a record member having preselected light transmitting properties providing electrical output indications thereof, the record member having a preselected number of light transmitting information marks arranged in individual columns with the marks comprising a piece of information being arranged in the same row, the record member including a timing light transmitting mark arranged in an individual column and in alignment with each row of information marks, said read-out device comprising:
a plurality of elements for individually producing electrical output indications in response to a light signal impinging thereon, one element for each information column and one element for the timing column of the record member to receive the light impinging thereon through the light transmitting marks aligned therewith, at least one element arranged with said plurality of elements to receive the light transmitted thereto directly through the record member to provide an output indication of the light transmitting properties of the record member, a source of light;
circuit means connected to be conductively responsive to the information output indications for electrically reproducing the recorded information marks and the timing mark, said circuit means comprising a plurality of two input, differential comparators corresponding to each column of information marks and the column of timing marks, and an electro-optical network connected in common with one of the inputs to each of the comparators for setting the transparency light threshold corresponding to the sensed transparency of the record member to be read, the output indications from said one tape transparency element being connected to said network for modifying said light threshold setting in accordance with the sensed transparency indications; and
circuit means connected to each of the other inputs for each of said comparators for defining an information light threshold for each of the comparators so that the information signals must be greater than the threshold level to condition the comparators to be conductive, the output of the timing mark comparator being connected in common with each of said other inputs so that the reception of a timing mark signal is effective at each of the information comparators to lower said information threshold to allow the comparator to be rendered conductive upon the reception of an information signal during the interval the output signal is present at the timing comparator having an amplitude in excess of the necessary differential signal in accordance with the setting of the electro-optical network.

2. A read-out device for sensing light transmitting marks arranged in rows and columns on a record member having preselected light transmitting properties and providing electrical output indications thereof, the record member having a preselected number of light transmitting information marks arranged in individual columns with the marks comprising a piece of information being arranged in the same row, the record member including a timing light transmitting mark arranged in an individual column and in alignment with each row of information marks, said read-out device comprising:
a plurality of elements for individually producing electrical output indications in response to a light signal impinging thereon, one element for each information column and one element for the timing column of the record member to receive the light impinging thereon through the light transmitting marks aligned therewith, a pair of elements arranged on opposite sides of the timing column element to receive the light transmitted thereto directly through the record member to provide an output indication of the light transmitting properties of the record member;
means for mounting the plurality of elements to expose the individual elements to light;
said means including individual light transmitting means for channeling light from a particular area of the record member to the light exposed ends of the individual element of the plurality of elements corresponding to the same particular area;
a source of light;
a light fiber system mounted intermediate the source of light and said mounting means for receiving the circular pattern of light from the light source and distributing it as a pattern of light over the closure member and conforming to the light transmitting pattern of the closure member so as to illuminate a record member to be read when positioned between said mounting means and said latter mentioned end of the light fiber system;
circuit means connected to be conductively responsive to the information output indications for electrically reproducing the recorded information marks and the timing mark, said circuit means comprising a plurality of two input, differential, comparators corresponding to each column of information marks and the column of timing marks, and an electro-optical network connected in common with one of the inputs to each of the comparators for setting the transparency light threshold corresponding to the sensed transparency of the record member to be read, the output indications from the pair of tape transparency elements being connected in common to said network for modifying said light threshold in accordance with the record member transparency indications to reduce the differential signal with increases in sensed transparency indications; and circuit means connected to each of the other inputs for each of said comparators for defining an information light threshold for each of the comparators so that the information signals must be greater than the threshold level to condition the comparators to become conductive, the output of the timing mark comparator being connected in common with each of said other inputs so that the reception of a timing mark signal is effective at each of the information comparators to lower said information threshold to allow the comparator to be rendered conductive upon the reception of an information signal during the interval the output signal is present at the timing comparator having an amplitude in excess of the necessary differential signal in accordance with the setting of the electro-optical network.

3. A read-out device as defined in claim 2 wherein the source of light includes parabolic reflecting means and projection means for receiving the light rays and projecting a thin, circular beam of light.

4. A read-out device for sensing light transmitting marks arranged in rows and columns on a record member having preselected light transmitting properties and providing electrical output indications thereof, the record member having a preselected number of light transmitting information marks arranged in individual columns with the marks comprising a piece of information being arranged in the same row, the record member including a timing light transmitting mark arranged in an individual column and in alignment with each row of information marks, said read-out device comprising:

a plurality of elements for individually producing electrical output indications in response to a light signal impinging thereon, one element for each information column and one element for the timing column of the record member to receive the light impinging thereon through the light transmitting marks aligned therewith, a pair of elements arranged on opposite sides of the timing column element to receive the light transmitted thereto directly through the record member to provide an output indication of the light transmitting properties of the record member;

means for mounting the plurality of elements to expose the individual elements to light;

a light rejection tunnel block having a plurality of tunnels corresponding to the plurality of said individual elements arranged in said mounting means over the light exposed ends of the plurality of elements;

a mask having a plurality of individual light transmitting apertures corresponding to the configuration of the rejection tunnels and arranged over the tunnel block with the apertures of the mask and block in alignment;

a closure member for the mounting means including fiber optical elements arranged over the mask for exposing the apertured portions of the mask to light;

a source of light providing a preselected thin, circular beam of light arranged in a plane orthogonal to the plane for said plurality of elements;

a light fiber system mounted intermediate the source of light and said mounting means for receiving the circular pattern of light from the light source and distributing it as a pattern of light conforming to the light transmitting pattern of the closure member so as to illuminate a record member to be read when positioned between said mounting means and said latter mentioned end of the light fiber system;

circuit means connected to be conductively responsive to the information output indications for electrically reproducing the recorded information marks and the timing mark, said circuit means comprising a plurality of two input, differential comparators corresponding to each column of information marks and the column of timing marks, and an electro-optical network connected in common with one of the inputs to each of the comparators for setting the transparency light threshold corresponding to the sensed transparency of the record member to be read;

the output indications from the pair of tape transparency elements being connected in common to said network for modifying said light threshold in accordance with the record member transparency indications to reduce the differential signals in accordance with increases in record member transparencies; and circuit means connected to each of the other inputs for each of said comparators for defining an information light threshold for each of the comparators so that the information signals must be greater than the threshold level to condition the comparators to become conductive, the output of the timing mark comparator being connected in common with each of said other inputs so that the reception of a timing mark signal is effective at each of the information comparators to lower said information threshold to allow the comparator to be rendered conductive upon the reception of an information signal during the interval the output signal is present at the timing comparator.

5. A read-out device for sensing light transmitting marks arranged in rows and columns on a record member having preselected light transmitting properties and providing electrical output indications thereof, the record member having a preselected number of light transmitting information marks arranged in individual columns with the marks comprising a piece of information being arranged in the same row, the record member including a timing light transmitting mark arranged in an individual column and in alignment with each row of information marks, said read-out device comprising:

a plurality of photovoltaic elements for individually producing electrical output indications in response to a light signal impinging thereon, one element for each information column and one element for the timing column of the record member to receive the light impinging thereon through the light transmitting marks aligned therewith, a pair of elements arranged on opposite sides of the timing column element to receive the light transmitted thereto directly through the record member to provide an output indication of the light transmitting properties of the record member;

means for mounting the plurality of elements to expose the individual elements to light;

a light rejection tunnel block having a plurality of tunnels corresponding to the plurality of said individual elements arranged in said mounting means over the light exposed ends of the plurality of elements;

a mask having a plurality of individual light transmitting apertures corresponding to the configuration of the rejection tunnels and arranged over the tunnel block with the apertures of the mask and block in alignment;

a closure member for the mounting means including fiber optical elements arranged over the mask for exposing the apertured portions of the mask to light;

a source of light comprising a General Electric 1974 quartz iodine cycle lamp or the equivalent, a parabolic reflecting means mounted with the lamp for providing a preselected thin, circular beam of light arranged in a plane orthogonal to the plane for said plurality of elements;

a light fiber system mounted intermediate the source of light and said mounting means for receiving the circular pattern of light from the light source and distributing it as a pattern of light conforming to the light transmitting pattern of the closure member so as to illuminate a record member to be read when positioned between said mounting means and said latter mentioned end of the light fiber system, and circuit means connected to be conductively responsive to the information output indications for electrically reproducing the recorded information marks and the timing mark, said circuit means comprising a plurality of two input. differential comparators corresponding to each column of information marks and the column of timing marks, and an electro-optical network connected in common with one of the inputs to each of the comparators for setting the transparency light threshold corresponding to the sensed transparency of the record member to be read, the output indications from the pair of tape transparency elements being connected in common to said network for modifying said light threshold in accordance with the record member transparency indications; and circuit means connected to each of the other inputs for each of said comparators for defining an information light threshold for each of the comparators so that the information signals must be greater than the threshold level to condition the comparators conductive, switching circuit means connected to the output of the timing mark comparator to be switchable responsive thereto and being normally arranged in a conductive mode, the output of said switching circuit being connected in common with each of said other inputs so that the reception of a timing mark signal is effective to render said switching circuit nonconductive thereby each of the information comparators have their information threshold lowered to allow the comparator to be rendered conductive upon the reception of an information signal during the interval the output signal is present at the timing comparator.

6. A read-out device as defined in claim 5 wherein the beam of light provides a light distribution pattern on the order of 10°.